(12) United States Patent
Schafer

(10) Patent No.: US 7,997,406 B2
(45) Date of Patent: Aug. 16, 2011

(54) CONVEYOR APPARATUS

(75) Inventor: Scott D. Schafer, Spokane, WA (US)

(73) Assignee: Flsmidth A/S (DK)

( * ) Notice: Subject to any disclaimer, the term of this patent is extended or adjusted under 35 U.S.C. 154(b) by 240 days.

(21) Appl. No.: 12/465,834

(22) Filed: May 14, 2009

(65) Prior Publication Data
US 2010/0288603 A1    Nov. 18, 2010

(51) Int. Cl.
*B65G 21/10*    (2006.01)
(52) U.S. Cl. .................. 198/861.3; 198/318; 198/592
(58) Field of Classification Search .......... 198/318–320, 198/592, 861.3
See application file for complete search history.

(56) References Cited

U.S. PATENT DOCUMENTS

| | | | | |
|---|---|---|---|---|
| 1,089,306 A | * | 3/1914 | Bell | 104/6 |
| 1,462,510 A | * | 7/1923 | Lister | 198/313 |
| 1,510,479 A | * | 10/1924 | Hoven | 198/592 |
| 2,267,419 A | * | 12/1941 | Oster | 209/241 |
| 2,530,496 A | * | 11/1950 | Watson | 198/314 |
| 2,577,926 A | | 12/1951 | Stiles | |
| 2,675,118 A | * | 4/1954 | Morrison | 198/463.3 |
| 2,777,564 A | * | 1/1957 | Russell, Jr. | 414/794.5 |
| 3,051,295 A | * | 8/1962 | Moy | 198/313 |
| 3,067,858 A | | 12/1962 | Stanley | |
| 3,185,290 A | | 5/1965 | Dietrich | |
| 3,623,597 A | * | 11/1971 | Arndt | 198/316.1 |
| 4,029,200 A | | 6/1977 | Dillon | |
| 4,202,434 A | * | 5/1980 | Herron | 198/316.1 |
| 4,245,732 A | | 1/1981 | Couperus | |
| 4,406,361 A | | 9/1983 | Konigs et al. | |
| 4,518,079 A | | 5/1985 | Paelke | |
| 4,585,384 A | * | 4/1986 | Richard et al. | 414/141.1 |
| 4,629,060 A | | 12/1986 | Schlegel et al. | |
| 4,907,932 A | | 3/1990 | Grathoff | |
| 5,013,201 A | * | 5/1991 | Grathoff et al. | 414/139.4 |
| 5,181,600 A | | 1/1993 | Chappell et al. | |
| 6,296,106 B1 | * | 10/2001 | Marchesini | 198/608 |
| 6,360,876 B1 | | 3/2002 | Nohl et al. | |
| 6,896,123 B1 | | 5/2005 | Horak | |

FOREIGN PATENT DOCUMENTS

JP    02305718 A    * 12/1990

OTHER PUBLICATIONS

FLSmidth Brochure Materials.

* cited by examiner

*Primary Examiner* — Mark A Deuble
(74) *Attorney, Agent, or Firm* — Aaron M. Pile; Daniel DeJoseph

(57) ABSTRACT

A conveyor apparatus includes a tail portion connected to a head portion such that the head portion is moveable relative to the tail portion from a first position to a second position located lower than the first position. It should be appreciated that such movement of the head portion can permit the drop height of the conveyor apparatus to be adjusted. At least one frame portion is moveably positioned between the tail portion and the head portion. A stacker is also provided that includes the conveyor apparatus.

19 Claims, 9 Drawing Sheets

CONVEYOR APPARATUS

FIELD OF THE INVENTION

The present invention relates to material handling and, more particularly, to stackers and conveyors.

BACKGROUND OF THE INVENTION

Conveyors are used to discharge material at a fixed height above ground to stack material such as agglomerated material, ore, or minerals. Such conveyors are typically included in stackers or other devices used to discharge material at a fixed height. U.S. Pat. Nos. 3,185,290, 4,029,200, 4,245,732, 4,406,361, 4,629,060, 4,907,932, 5,181,600, 6,360,876, and 6,896,123 disclose different types of conveyor apparatuses or stackers.

Some conveyed materials such as agglomerated ore are sensitive to drop height. Often, luffing conveyors are used to reduce the drop height of the material. Reducing the drop height can help reduce degradation or spoilage of the material being stacked. Many types of luffing conveyors are configured to move the whole conveyor, which complicates its receiving hopper and can substantially increase the cost of such machines.

In alternative luffing conveyor designs, a luffing conveyor includes a luffing end that can be affixed to a fixed conveyor to lower the drop height of a stacker or other stacking device or conveyor apparatus. Typically, a hinged luffing conveyor has a bend pulley affixed at the hinge point of the conveyor. The conveyor belt must transition from a troughed area to a flat portion and back to a troughed area in a relatively short distance. At some luffing discharge angles, the material can lift off of the belt as it transitions over the hinge pulley such that the material falls back on the belt at a higher velocity than the belt speed, losing traction between the material and the belt. As a result, material may fall from an undesirably high height, which increases degradation and spillage. This is particularly true for large luffing discharge angles.

A conveyor apparatus is needed to more consistently convey material to a desired drop height, particularly at large luffing discharge angles. Preferably, such a conveyor apparatus eliminates the need for a fixed bend pulley and can increase the belt life of the conveyor.

SUMMARY OF THE INVENTION

A conveyor apparatus is provided that includes a tail portion moveably connected to a head portion such that the head portion is moveable relative to the tail portion from a first position to a second position located lower or higher than the first position. The conveyor apparatus also includes at least one frame portion moveably positioned between the tail portion and the head portion such that the one or more frame portions move when the head portion moves from the first position to the second position.

In some embodiments of the conveyor apparatus, the one or more frame portions may include a first frame portion attached between the tail portion and the head portion. The first frame portion may be moveably attached to the tail portion or the head portion or both the tail portion and head portion. Preferably, the first frame portion includes a first elongated member and a second elongated member that each extends from the tail portion to the head portion and is moveably attached to at least one of the tail portion and the head portion.

The one or more frame portions may also include additional frame portions. For example, in some embodiments, the one or more frame portions may include a second frame portion that is moveably attached to the first frame portion adjacent to a first side of the second frame portion. The second frame portion may also be attached to the tail portion or the head portion adjacent to a second side of the second frame portion that is opposite the first side of the second frame portion. For instance, the second side of the second frame portion may be moveably attached to the tail portion or the head portion.

As another example, the one or more frame portions could also include a third frame portion. The third frame portion could be moveably attached to the first frame portion adjacent to a first side of the third frame portion and may also be attached to the head portion or tail portion at a second side of the third frame portion opposite the first side of the third frame portion. In embodiments where the second frame portion is attached to the tail portion, the second side of the third frame portion can be attached to the head portion. In embodiments where the second frame portion is attached to the head portion, the second side of the third frame portion may be attached to the tail portion. Preferably, the second side of the third frame portion is moveably attached to the head portion or tail portion.

As yet another example, the one or more frame portions could also include a fourth frame portion. The fourth frame portion could be moveably attached to the second frame portion or the third frame portion adjacent to the first side of the fourth frame portion and can be attached to the other of the second frame portion and the third frame portion adjacent to the second side of the fourth frame member opposite the first side of the fourth frame member.

Preferably, at least one frame member portion of the one or more frame member portions is attached to at least one idler or troughed idler. In some embodiments of the conveyor apparatus, one frame portion of the one or more frame portions is attached to at least one idler or troughed idler that is aligned with an axis of movement defined by a plurality of hinges moveably attaching the tail portion to the head portion.

It should be understood that embodiments of the conveyor apparatus may include a flexible elongated member configured to move from the tail portion to the head portion. The flexible elongated member can be supported by the head portion, tail portion and the one or more frame portions. Preferably, the flexible elongated member is configured as a continuous chain or continuous belt.

In some embodiments of the conveyor apparatus, the conveyor apparatus does not need to include a fixed bend pulley aligned with an axis of rotation that defines a path of movement for the head portion.

Embodiments of the conveyor apparatus may also include at least one first frame portion moveably attached between the tail portion and an intermediate portion. At least one second frame portion may be moveably attached between the head portion and the intermediate portion. The one or more first and second frame portions may be configured to move when the head portion is moved from a first position to a second position to adjust a conveying path. For instance, a head portion and the intermediate portion may be moved such that the conveying path is adjusted from an S-shaped path to a linear or horizontal path.

A stacker is also provided. The stacker includes a base that supports the conveyor apparatus. The conveyor apparatus may include any of the above discussed conveyor apparatus embodiments. For instance, the conveyor apparatus may include a tail portion moveably connected to a head portion such that the head portion is moveable relative to the tail portion from a first position to a second position located lower or higher than the first position. The conveyor apparatus may also include at least one frame portion moveably positioned between the tail portion and the head portion.

In some embodiments of the stacker, the frame portions may include frame means configured to move when the head portion moves from the first position to the second position. For instance, the frame means may include one moveable frame portion, interconnected frame portions, or a first set of interconnected frame portions attached to one end of an intermediate portion and to a head portion and a second set of interconnected frame portions attached at the opposite end of the intermediate portion and the tail portion. It should be understood that embodiments of the conveyor apparatus may also include such frame means.

It should be appreciated that embodiments of the stacker may also include multiple conveyor apparatuses attached to each other. For instance, a stacker may have a first conveyor apparatus attached to a second conveyor apparatus such that the conveying path of the stacker may include different moveable configurations such as an S-shaped configuration or other path configurations that may require the use of multiple interconnected conveyor apparatuses.

It should be appreciated that embodiments of the stacker can be configured to adjust the drop height of the conveying apparatus or the stacker. For example, the head portion may be moved from a lower height to a higher height.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the conveyor apparatus and a stacker that includes such a conveyor apparatus are shown in the accompanying drawings in which.

DETAILED DESCRIPTION OF PRESENT PREFERRED EMBODIMENTS

Figure 1:
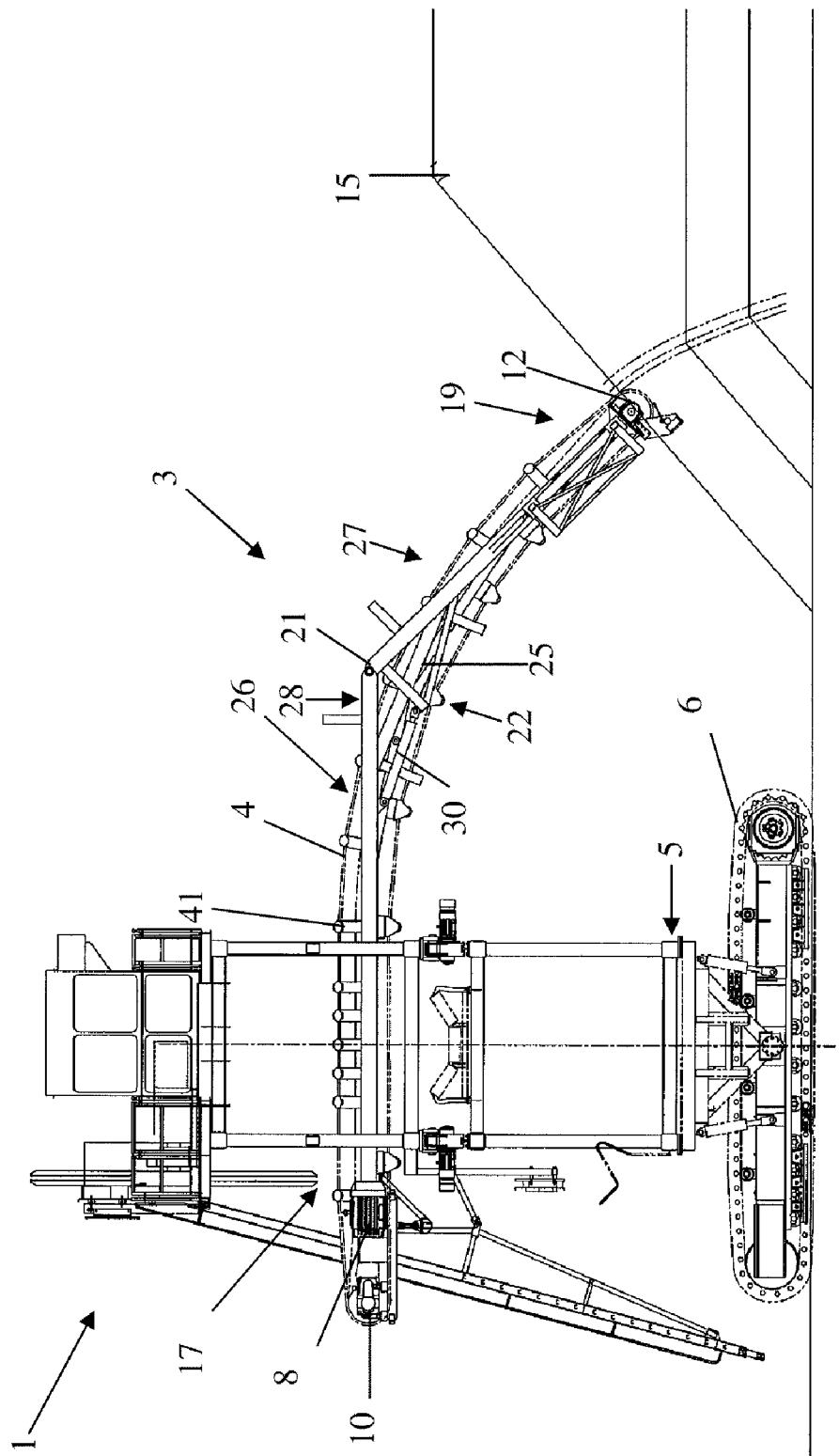
FIG. 1 is a side view of a first present preferred embodiment of a stacker having a first present preferred embodiment of the conveyor apparatus in a first position. The belt of the conveyor apparatus and the track of the stacker base are illustrated in chain line.
Figure 2:
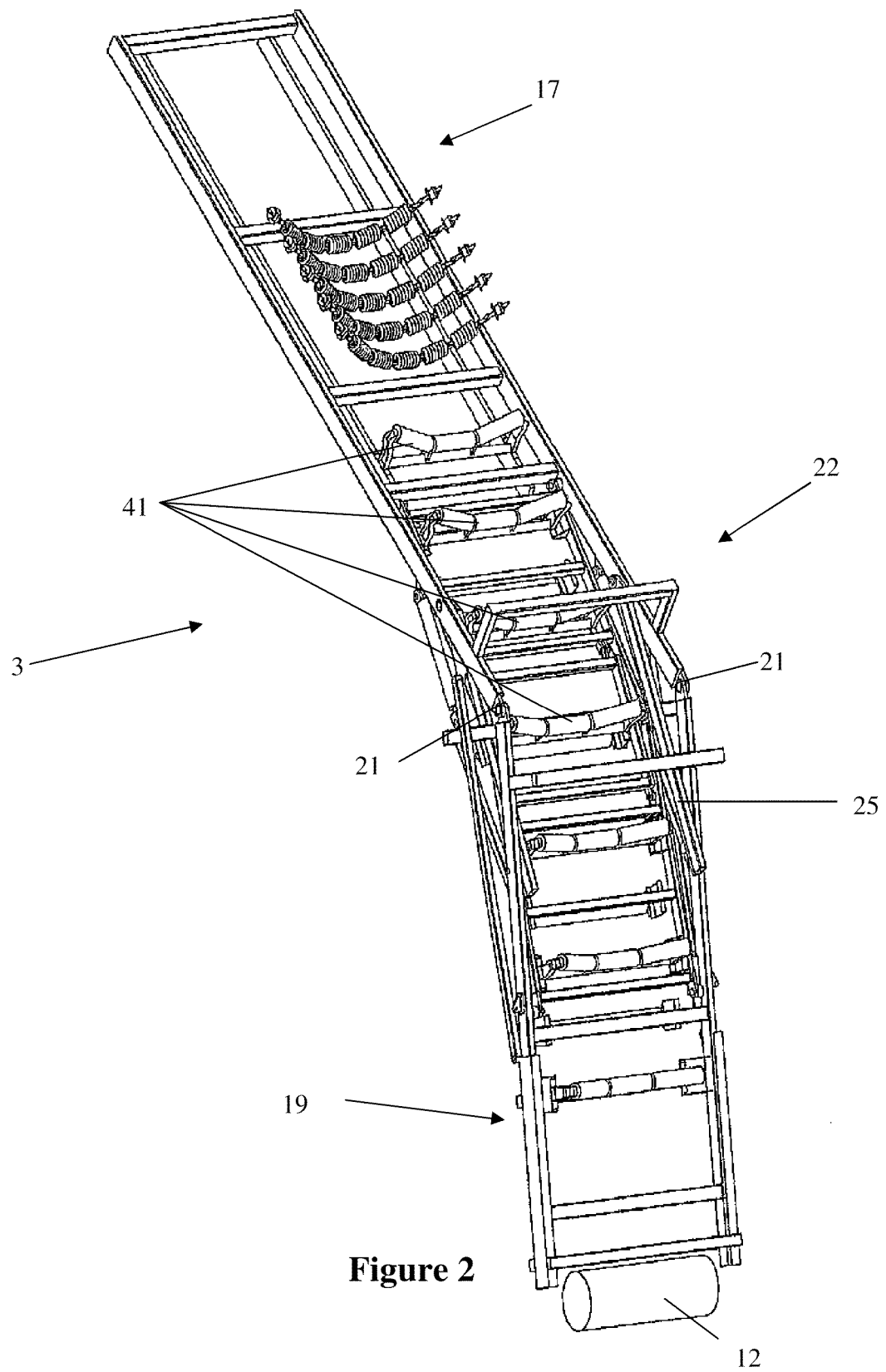
FIG. 2 is a perspective view of the first present preferred embodiment of the conveyor apparatus in the first position.
Figure 3:
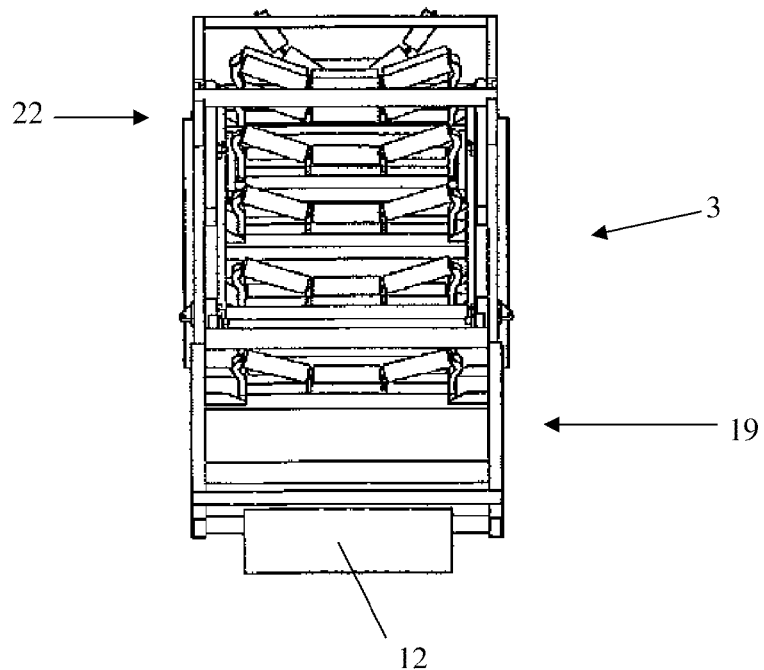
FIG. 3 is a front view of the first present preferred embodiment of the conveyor apparatus in the first position.
Figure 4:
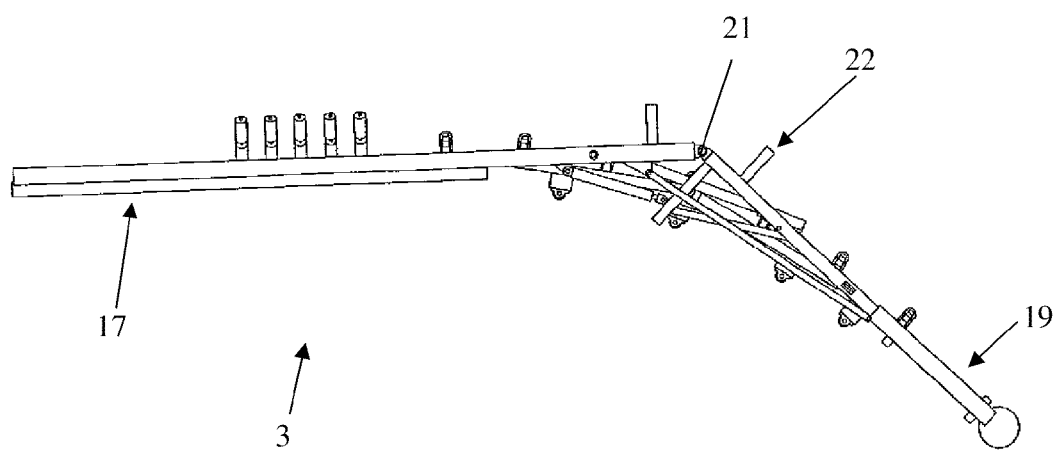
FIG. 4 is a side view of the first present preferred embodiment of the conveyor apparatus in the first position.
Figure 5:
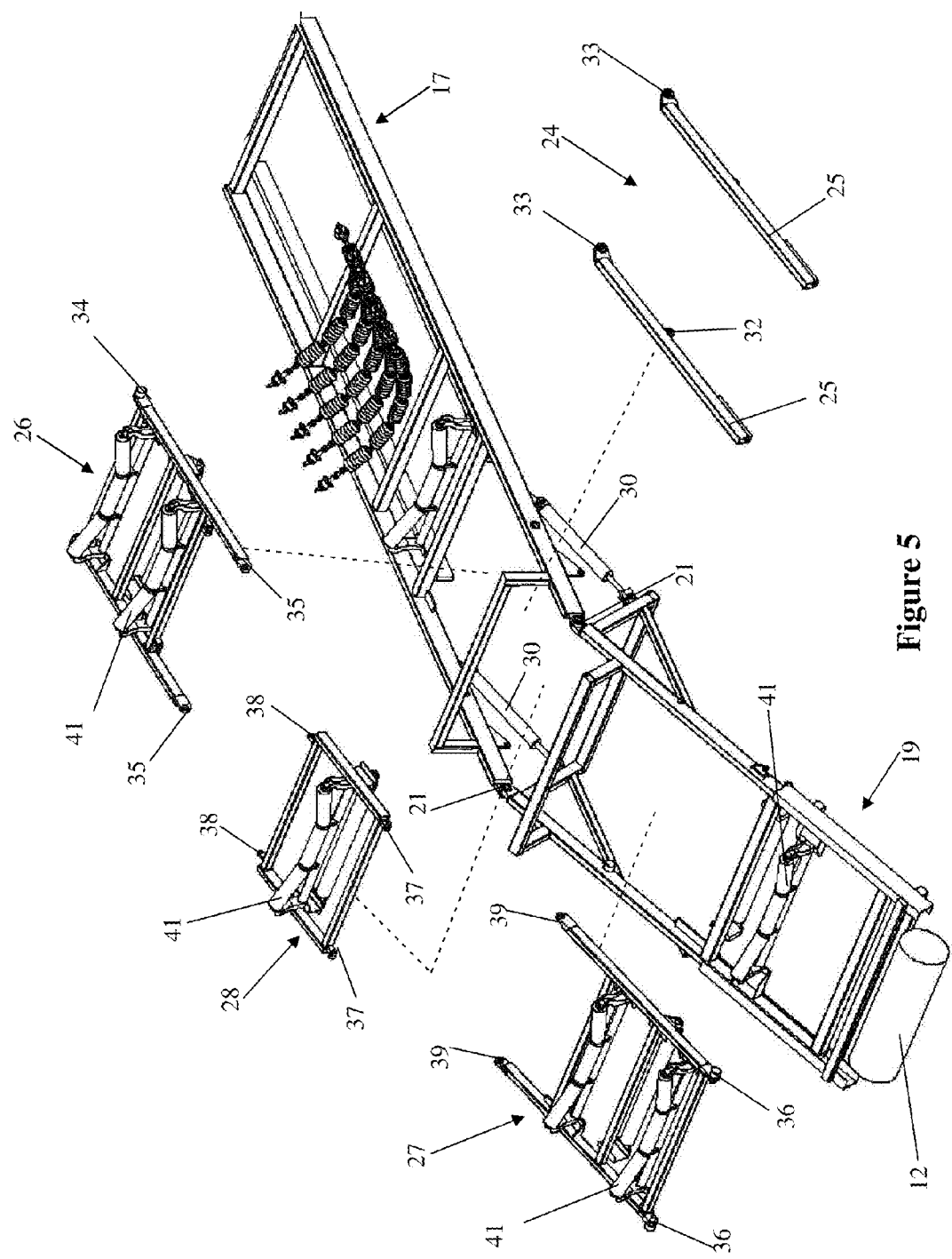
FIG. 5 is an exploded view of the first present preferred embodiment of the conveyor apparatus in the first position.

Referring to FIG. 1, a present preferred embodiment of a stacker 1 that includes a present preferred embodiment of a conveyor apparatus 3 is shown. The stacker 1 has a base 5 that includes tracks 6 configured to move the stacker 1. The base 5 of the stacker also supports the conveyor apparatus 3.

The conveyor apparatus 3 includes a belt 4 or other flexible elongated member configured to rotate about the conveyor apparatus. A belt drive 8 or other motor is provided adjacent to the tail portion 17 of the conveyor apparatus. A drive pulley 10 is connected to the belt drive 8 and rotates to move the belt 4. A belt pulley 12 is provided adjacent to a head portion 19 of the conveyor apparatus 3. The belt pulley rotates to help the conveyor belt rotate about the head portion 19 of the conveyor apparatus. The conveyor apparatus 3 includes a number of idlers 41 positioned along the conveyor apparatus 3. The idlers engage the belt 4 and help guide the movement of the belt 4.

Figure 6:
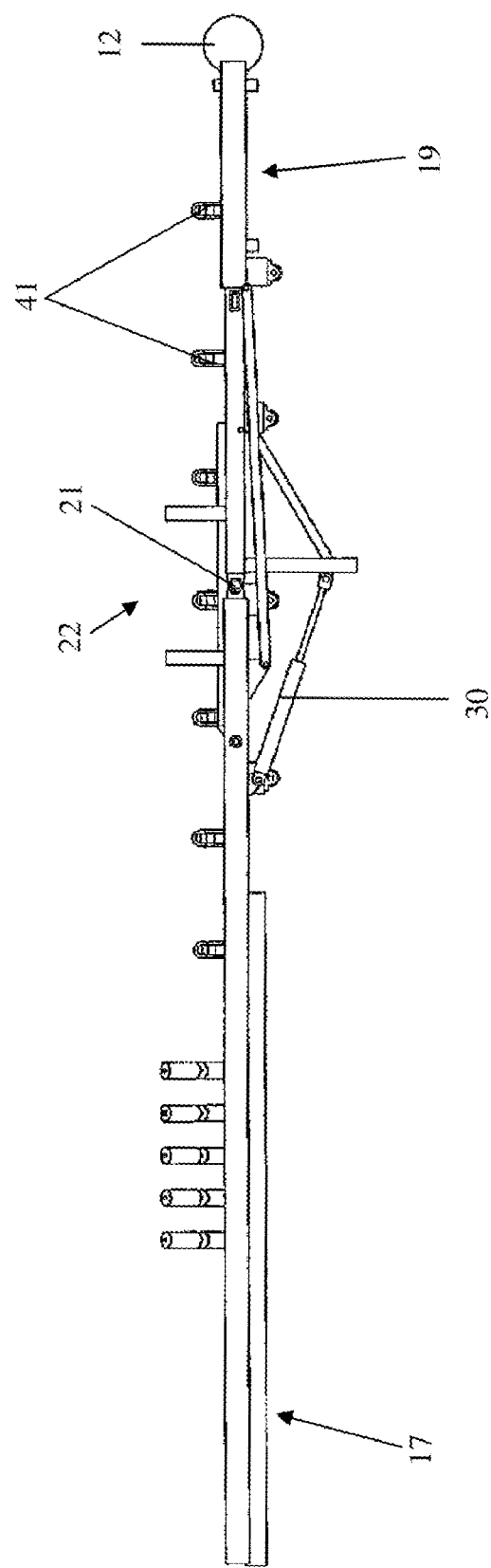
FIG. 6 is a side view of the first present preferred embodiment of the conveyor apparatus in a second position, which is higher than the first position.
Figure 7:
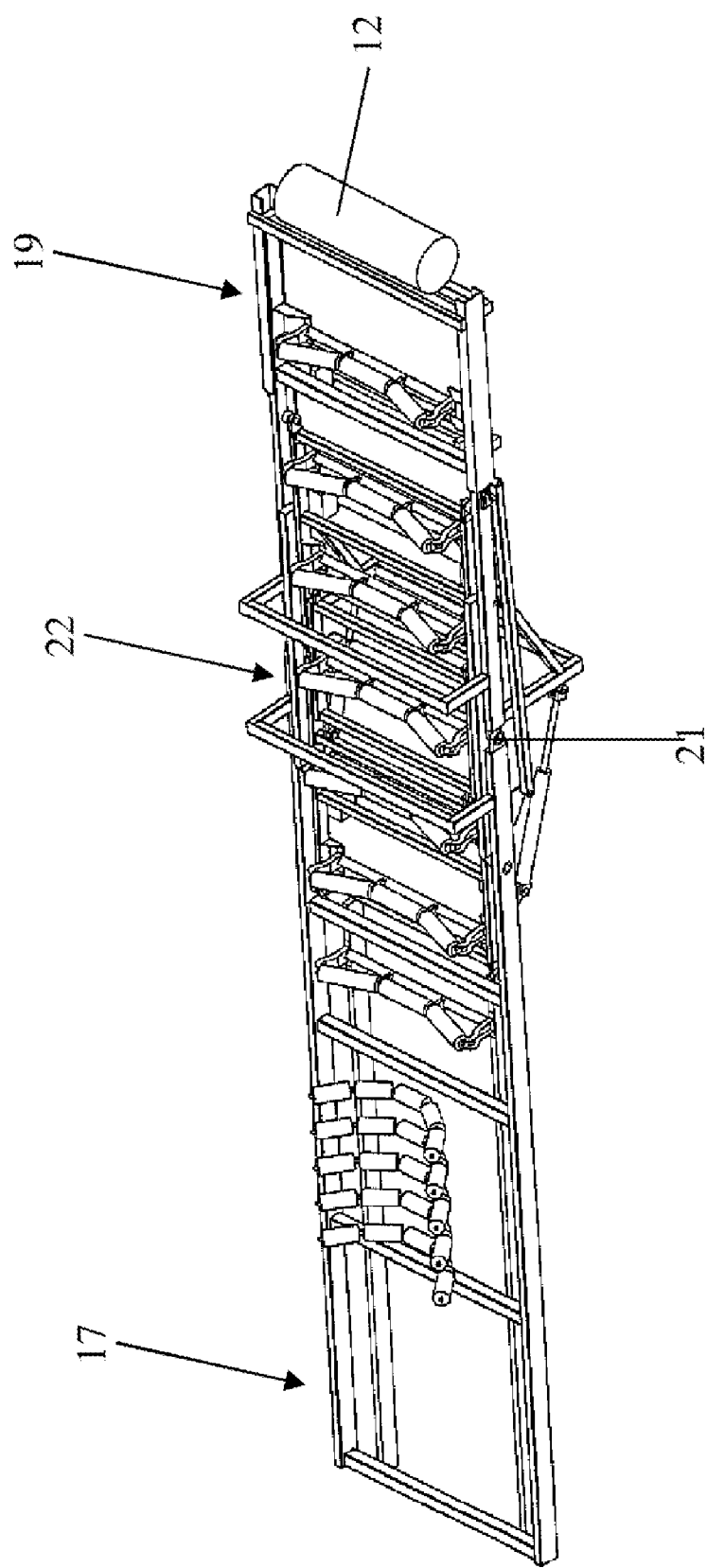
FIG. 7 is a perspective view of the first present preferred embodiment of the conveyor apparatus in the second position.
Figure 8:
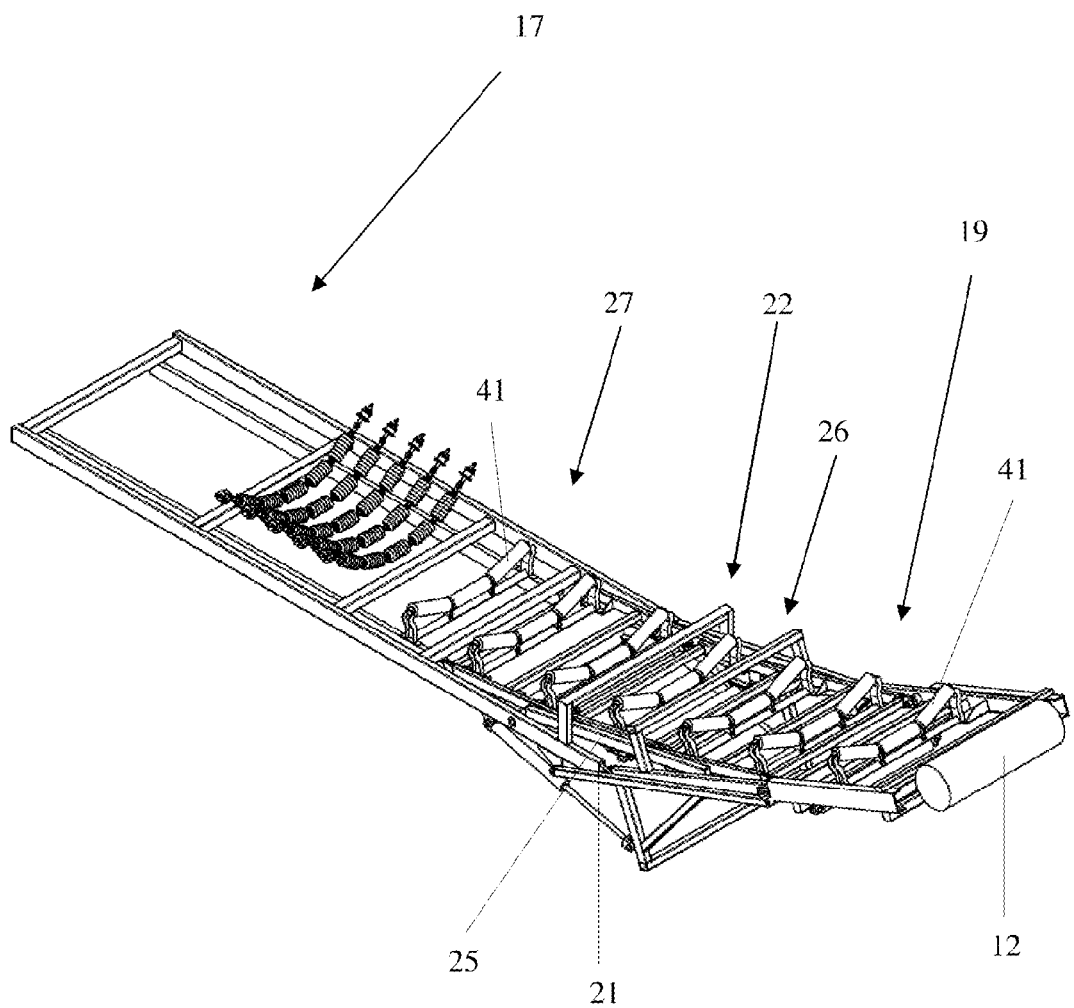
FIG. 8 is a perspective view of the first present preferred embodiment of the conveyor apparatus in a third position, which is higher than the second position and the first position.

As may be appreciated from FIGS. 2-7, the head portion 19 of the conveyor apparatus 3 is attached to the tail portion 17 at hinges 21 such that the head portion 19 may move from a first position, such as the position of the head portion 19 shown in FIGS. 1-5, to a second position, such as the position of the head portion shown in FIGS. 6-7. The head portion may also be moved from the first or second positions to a third position, which is shown in FIG. 8. It should be understood that the first position is lower than the second position since the drop height of the head portion is lower when it is in the first position than when it is in the second position and the third position is higher than the second position because the head portion has a higher drop height when it is in the third position than when it is in the second position.

The hinges 21 define an axis of rotation about which the head portion moves. It should be appreciated that the head portion 19 may also move to other positions between the first position and the second position. Shock absorbers 30, struts, or gas springs may be provided to help support the movement of the head portion for a smoother, less strain inducing movement. Pistons or other actuation mechanisms may be provided between the head portion 19 and tail portion 17 adjacent to the hinged connection 21 to help drive movement of the head portion 19 to different positions.

The movement of the head portion 19 permits the drop height of the stacker 3 to be adjusted for different material being stacked or to adjust the stacking of material for different weather conditions. For example, a lower drop height may be preferred for windy days of operation while a higher drop height may be acceptable for calm days that have little or no wind.

The conveyor apparatus 3 includes multiple moveable frames 22 between the head portion 19 and tail portion 17. A first frame 24 includes two members 25. Each member 25 is rotatably attached to tail portion 17 and is also attached to the head portion 19.

A pivot point 32 is located at a middle portion of each member 25 of the first frame 24. A second frame 26 and third frame 27 are both pivotally attached to the first frame 24 at these pivot points 32 of the members 25. The second frame 26 is attached to the members 25 at attachment portions 35 located adjacent to the first side of the second frame 26. The third frame 27 is attached to the members 25 at the attachment portions 39 located adjacent to the first side of the third frame 27. Each attachment portion 35 may also be configured for interconnection with a respective attachment portion 39.

The second frame 26 is also attached to the tail portion 17 at attachment portions 34 located adjacent to a second side of the second frame 26 that is opposite the first side of the second frame 26. The second frame 26 may be attached to the tail portion 17 at attachment portions 34 such that it is affixed to the tail portion 17 or such that the second frame 26 is rotationally or moveably attached to the tail portion 17. The second frame 26 may move relative to the tail portion 17 when the head portion 19 is moved from the first position to the second position or the third position.

The third frame 27 is also attached to the head portion 19 adjacent to a second side of the third frame 27, which is located opposite the first side of the third frame 27. The third frame 27 may be attached to the head portion 19 at attachment portions 36 located such that it is affixed to the head portion 19 or such that the third frame 27 is rotationally or moveably attached to the head portion 19. The third frame 27 may move relative to the head portion 19 when the head portion 19 is moved from the first position to the second position.

A fourth frame 28 is attached to the second frame 26 adjacent to its first side at attachment portions 38 and is also attached to the third frame 27 adjacent to its second side at attachment portions 37. The fourth frame 28 may be moveably or rotationally attached to the second frame 26, the third frame 27, or both the second frame 26 and third frame 27. Preferably, the fourth frame is positioned adjacent to the hinged connections 21 between the tail portion 17 and the head portion 19.

It should be understood that the attachment portions 34, 35, 36, 37, 38 and 39 may include different attachment mechanisms or portions of such mechanisms. For instance, attachment portions 34, 35, 36, 37, 38 and 39 may each form at least a portion of a pivotal connection or a slideable connection. As a more particular example, the attachment portions may include pivot pins or slides.

One or more idlers 41 may be attached to each of the frame members 26, 27, and 28. Preferably, an idler 41 of the fourth frame 28 is aligned with the hinges 21 such that the idler may support a portion of the belt 4 that travels about the hinged area of the conveyor apparatus 3. Most preferably, the idlers 41 of the second, third and forth frames are troughed idlers and the idlers of the multiple frames are equally spaced apart.

Due to the moveable interconnections between the first frame 24, the second frame 26, the third frame 27 and fourth frame 28, it has been determined that the conveyor apparatus 3 does not need a fixed bend pulley adjacent the hinge points between the head portion 19 and the tail portion 17 or in alignment with the rotational axis defined by the hinge points. Indeed, it has been found that the replacement of a bend pulley with the moveable interconnected frame portions lowers belt stress and increases belt life of the conveyor apparatus 3. Moreover, the multiple moveably connected frames 22 reduce, if not eliminate, the occurrence of material falling off the belt or losing traction with the belt after passing from the tail portion to the head portion when the head portion 19 is positioned lower than the tail portion 17.

It is contemplated that variations may be made to the conveyor apparatus 3. For instance, it is contemplated that alternative embodiments of the conveyor apparatus 3 can include members 25 of the first frame 24 that are moveably or rotationally attached to both the tail portion 17 and the head portion 19 or just rotationally attached to the head portion 19. As another example, the fourth frame 28 may also be configured for moveable attachment to the first frame 24. It should also be understood that the conveyor apparatus 3 may be included in different type of stackers or other material handling devices.

Figure 9:
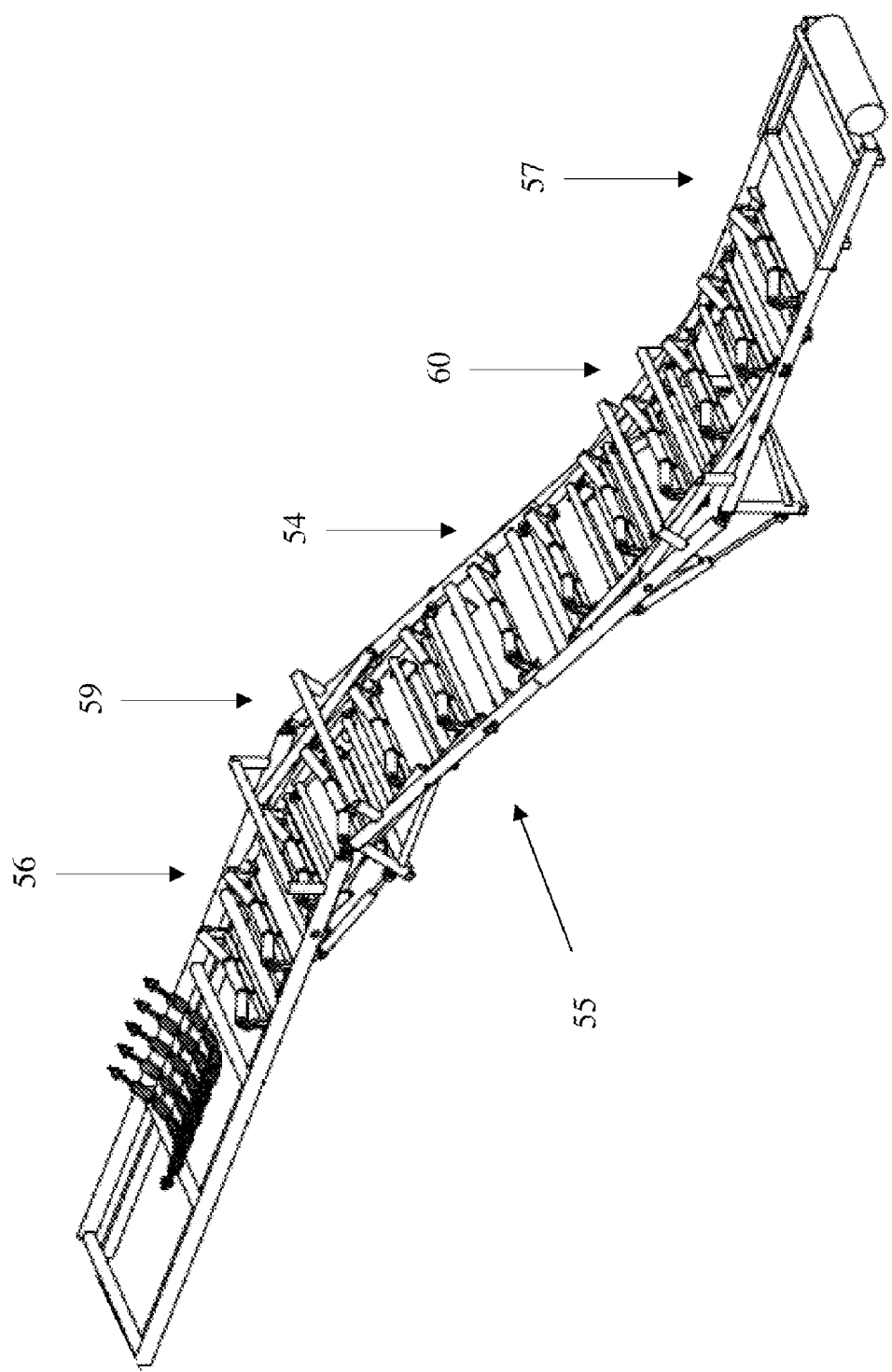
FIG. 9 is a perspective view of a second present preferred embodiment of the conveyor apparatus.
Figure 10:
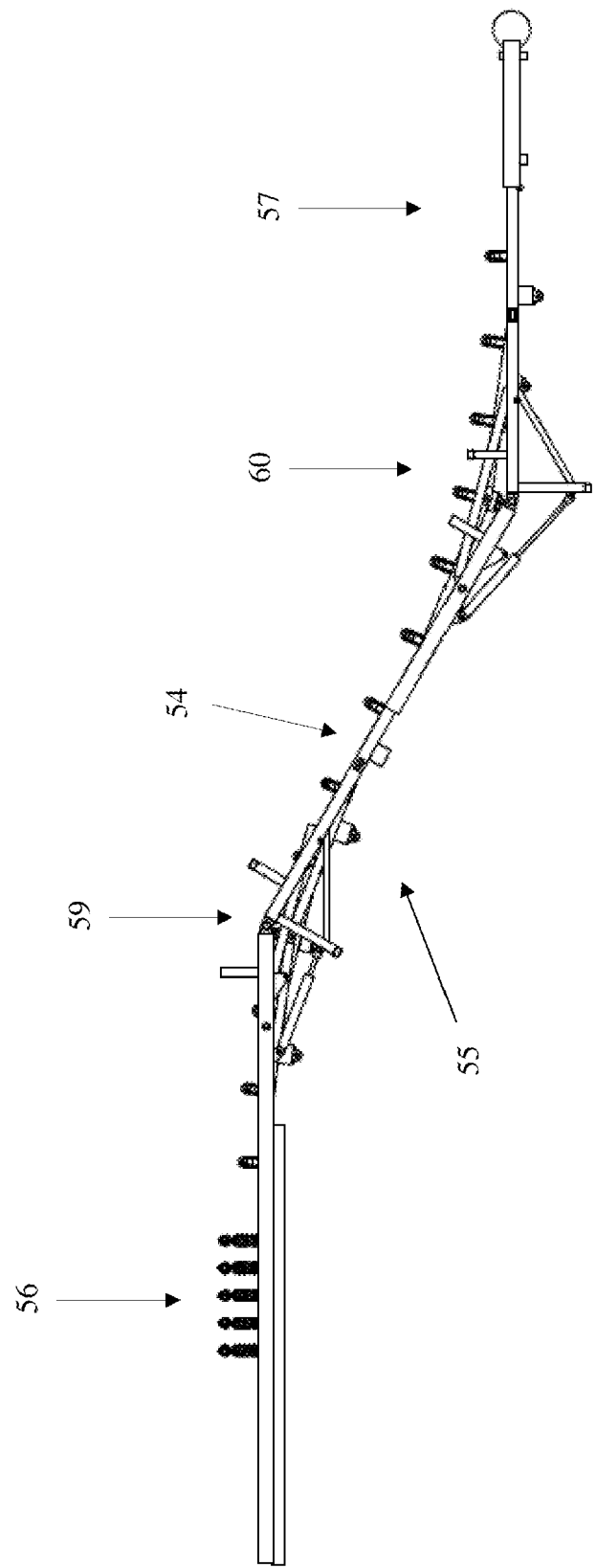
FIG. 10 is a side view of the second present preferred embodiment of the conveyor apparatus.

It is also contemplated that larger conveyor apparatuses may be formed by combining or moveably interconnecting multiple conveyor apparatuses 3 with at least one intermediate portion. For instance, as shown in FIGS. 9-10, a conveyor apparatus 55 has a tail portion 56 moveably attached to a head portion 57 by an intermediate portion 54. Moveable frame portions 59 and 60 are attached between the tail and head portions such that the conveying path of the conveyor apparatus 55 may be adjusted into different configurations, such as, for example, the S-shaped configuration shown in FIGS. 9-10. It should be appreciated that the moveable frame portions 59 and 60 may be configured similarly to frames 22 discussed above. Frame portions 59 include at least one frame portion moveably positioned between the tail portion 56 and the intermediate portion 54. Frame portions 60 include one or more frame portions moveably positioned between the intermediate portion 54 and the head portion 57.

Stackers may also be configured to include such a conveyor apparatus 55. Such stackers preferably have a base that at least partially supports the conveyor apparatus 55. The base may be moveable or may be affixed in a particular location.

While certain present preferred embodiments of the conveyor apparatus and stackers including such conveyor apparatuses have been shown and described above, it is to be distinctly understood that the invention is not limited thereto but may be otherwise variously embodied and practiced within the scope of the following claims.

What is claimed is:

1. A conveyor apparatus comprising:
    a tail portion moveably connected to a head portion such that the head portion is moveable relative to the tail portion from a first position to a second position located lower or higher than the first position;
    at least one frame portion moveably positioned between the tail portion and the head portion such that the at least one frame portion moves when the head portion moves from the first position to the second position; and
    at least one idler attached to said at least one frame portion.

2. The conveyor apparatus of claim 1 wherein the at least one frame portion further comprises:
    a first frame portion having a first end and a second end attached between the tail portion and the head portion having a first member and a second member, the first frame portion being moveably attached to at least one of the tail portion and the head portion;
    a second frame portion, the second frame portion having a first end and a second end opposite the first end, the second frame portion being moveably attached to the first frame portion adjacent to the first end of the second frame portion and the second frame portion attached to one of the tail portion or the head portion adjacent to the second end of the second frame portion.

3. The conveyor apparatus of claim 2 wherein the at least one frame portion is further comprised of:
    a third frame portion having a first end and a second end opposite the first end of the third frame portion and wherein the second frame portion is attached to the tail portion, the third frame portion moveably attached to the first frame portion adjacent to the first end of the third frame portion, the third frame portion attached to the head portion adjacent to the second end of the third frame portion.

4. The conveyor apparatus of claim 2 wherein the first end of the first frame portion is attached to the tail portion and the second end of the first frame portion is attached to the head portion.

5. The conveyor apparatus of claim 3 wherein each of the members of the first frame portion have a pivot point at which the first end of the second frame portion and the second end of the third frame portion are moveably attached.

6. The conveyor apparatus of claim 5 wherein said at least one frame portion is further comprising a fourth frame portion, the fourth frame portion having a first end and a second end opposite the first end of the fourth frame portion, the fourth frame portion moveably connected to one of the second frame portion or the third frame portion adjacent to the first end of the fourth frame portion and the fourth frame portion attached to the other of the second frame portion or the third frame portion adjacent to the second end of the fourth frame portion, the fourth frame portion moving when the head portion moves from the first position to the second position and the fourth frame portion being positioned adjacent to the pivot points of the members of the first frame portion.

7. The conveyor apparatus of claim 6 wherein at least one idler or at least one troughed idler is attached to each of said second, third and fourth frame portions.

8. The conveyor apparatus of claim 2 wherein the members of the first frame portion are elongated members that extend from the tail portion to the head portion.

9. The conveyor apparatus of claim 1 further comprising a flexible elongated member configured to move from the tail portion to the head portion, the flexible elongated member supported by the head portion, the tail portion and the at least one frame portion.

10. The conveyor of claim 1 further comprising a pulley with a floating axis arranged adjacent to an axis of rotation that defines a path of movement for the head portion.

11. A stacker comprising a base that supports a conveyor apparatus, the conveyor apparatus comprising a tail portion moveably connected to a head portion such that the head portion is moveable relative to the tail portion from a first position to a second position located lower or higher than the first position and at least one frame portion moveably positioned between the tail portion and the head portion such that the at least one frame portion moves when the head portion moves from the first position to the second position and at least one idler attached to said at least one frame portion.

12. The stacker of claim 11 wherein the at least one frame portion further comprises:
a first frame portion attached between the tail portion and the head portion having a first member and a second member, the first frame portion being moveably attached to at least one of the tail portion and the head portion;
a second frame portion, the second frame portion having a first end and a second end opposite the first end, the second frame portion being moveably attached to the first frame portion adjacent to the first end of the second frame portion and the second frame portion attached to one of the tail portion or the head portion adjacent to the second end of the second frame portion.

13. The stacker of claim 12 wherein the at least one frame portion further comprises a third frame portion having a first end and a second end opposite the first end of the third frame portion and wherein the second frame portion is attached to the tail portion, the third frame portion moveably attached to the first frame portion adjacent to the first end of the third frame portion, the third frame portion attached to the head portion adjacent to the second end of the third frame portion.

14. The stacker of claim 13 wherein each of the members of the first frame portion have a pivot point at which the first end of the second frame portion and the second end of the third frame portion are moveably attached.

15. The stacker of claim 14 wherein said at least one frame portion is further comprising a fourth frame portion, the fourth frame portion having a first end and a second end opposite the first end of the fourth frame portion, the fourth frame portion moveably attached to one of the second frame portion or the third frame portion adjacent to the first end of the fourth frame portion and the fourth frame portion attached to the other of the second frame portion or the third frame portion adjacent to the second end of the fourth frame portion, the fourth frame portion moving when the head portion moves from the first position to the second position and the fourth frame portion being positioned adjacent to the pivot points of the members of the first frame portion.

16. The stacker of claim 15 wherein at least one idler or at least one troughed idler is attached to each of said second, third and fourth frame portions.

17. The stacker of claim 11 wherein the members of the first frame portion are elongated members that extend from the tail portion to the head portion.

18. The stacker of claim 11 further comprising a plurality of actuation mechanisms positioned between the head portion and the tail portion to drive movement of the head portion from the first position to the second position.

19. The conveyor of claim 11 further comprising a pulley with a floating axis arranged adjacent to an axis of rotation that defines a path of movement for the head portion.

* * * * *